Jan. 10, 1950  R. PARKE  2,494,354
TOY VEHICLE

Filed Jan. 9, 1946  2 Sheets-Sheet 1

INVENTOR
Robert Parke
BY
Beau, Brooks, Buckley & Beau.
ATTORNEYS

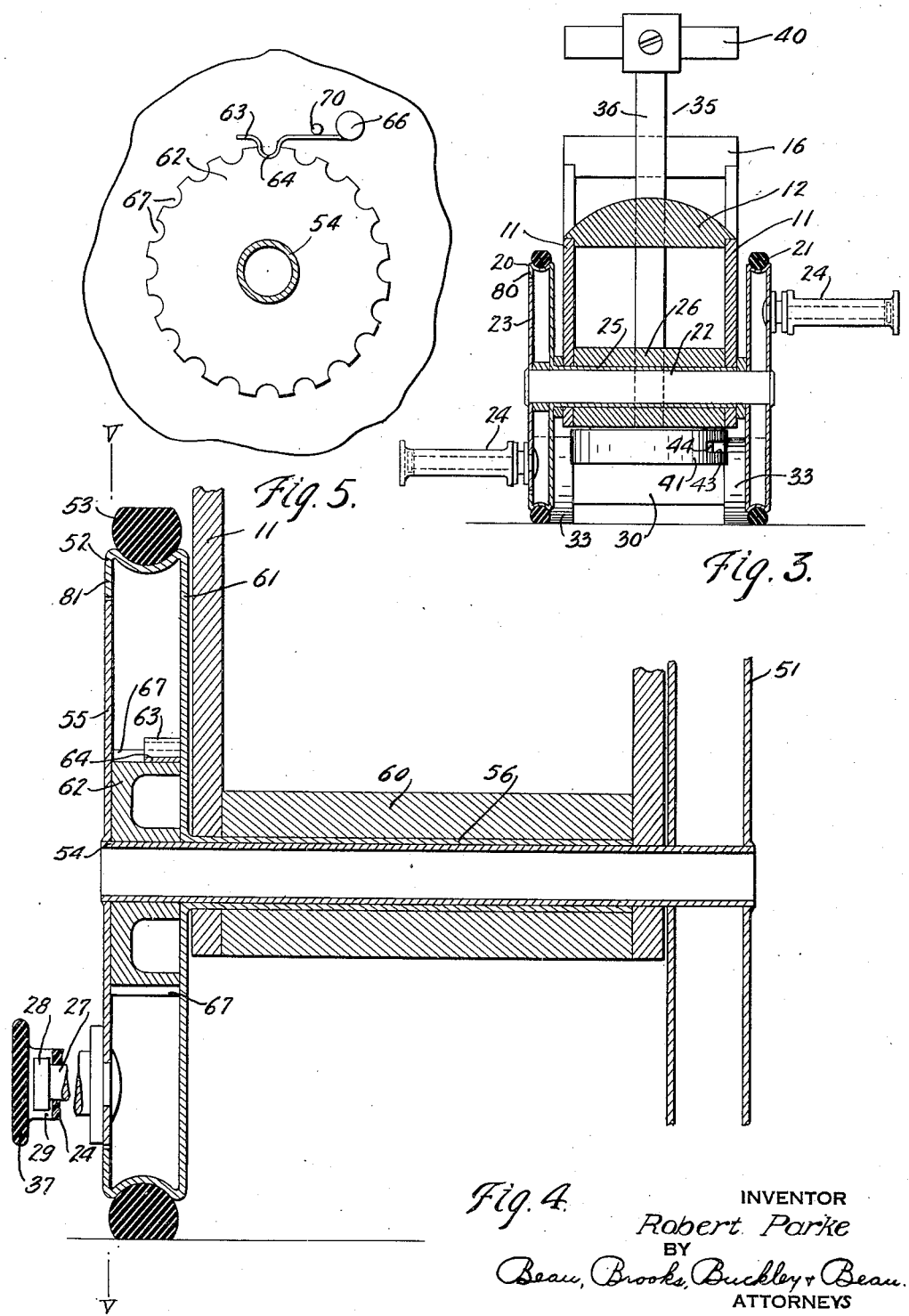

Patented Jan. 10, 1950

2,494,354

UNITED STATES PATENT OFFICE 2,494,354

TOY VEHICLE

Robert Parke, Buffalo, N. Y.

Application January 9, 1946, Serial No. 639,970

13 Claims. (Cl. 280—1.11)

My invention relates in general to toy vehicles of the foot propelled type for use by young children.

It is well known to those skilled in the art that heretofore vehicles of this type were usually equipped with three wheels, and steered by means of the front wheel or wheels which also acted as driving wheels. Such devices, as is well known, are very unstable and are easily upset by the child. Furthermore, it is well known that where the front wheels act as driving wheels as well as steering wheels, considerable energy exerted by the child is absorbed in the undesirable swiveling movement of the steering mechanism each time pressure is exerted upon a pedal.

The principal object of my invention has been to provide a vehicle having two pedal operated driving wheels at the front of the vehicle which are fixed in alignment with the axis of the vehicle, whereby all of the energy exerted by the child will be transmitted thereto.

Another object has been to provide a vehicle having two rear steering wheels by which the vehicle may be easily and promptly guided and whereby greater stability is achieved.

A further object has been to provide a steering mechanism which shall be separate and distinct in its operation from the actuation of the pedal-operated driving wheels. Moreover, my device is provided with transverse steering mechanism whereby the direction of steering movement will be in accordance with the direction of operation of the steering mechanism.

A further object has been to provide a vehicle possessing the general form and appearance of well-known wheeled objects, such as a locomotive, an automobile, a steam roller, etc., and to provide for the interchangeability of such bodies. A further advantage of such an arrangement is that the seat may be a part of the body at the proper height for the child, thereby eliminating the necessity of separate seat accessories.

Furthermore, my invention is provided with suitable compensating means, whereby, when rubber tires are used, the vehicle may be properly steered without the necessity of either of the driving wheels sliding on the supporting surface to compensate for the differential action of the wheels when steering.

Moreover, my device may be easily and inexpensively made of wood or other suitable material.

The above objects and advantages have been accomplished by the device shown in the accompanying drawings, of which:

Fig. 3 is a sectional view taken on line III—III of Fig. 1;

Fig. 4 is an enlarged sectional view showing the driving wheels equipped with differential means permitting the wheels to be driven in either direction while maintaining the differential relationship therebetween;

Fig. 5 is an enlarged fragmentary sectional view taken on line V—V of Fig. 4.

Figure 1:
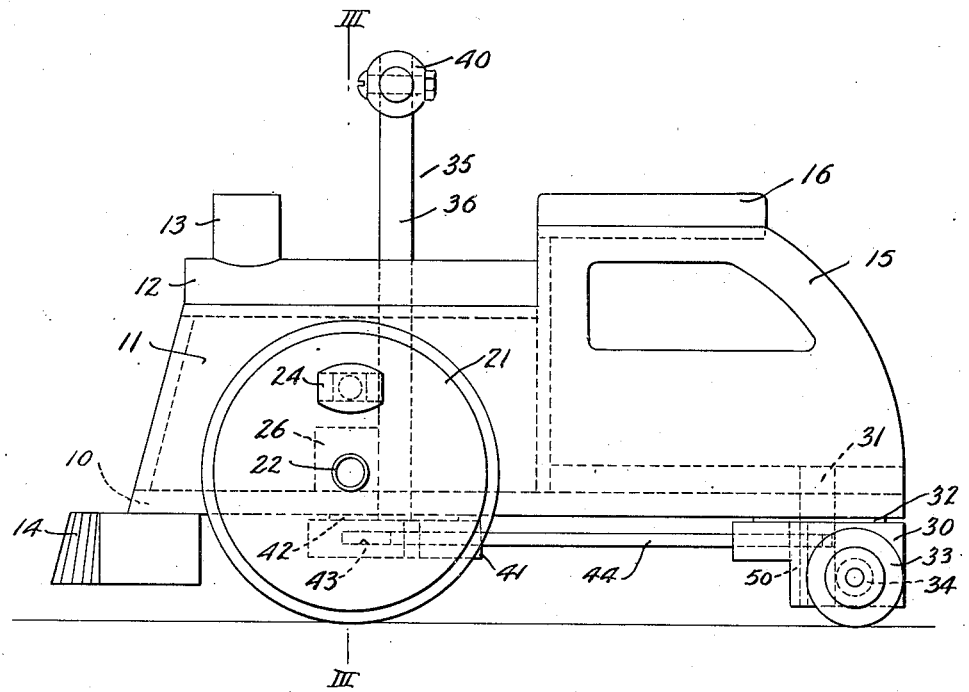
Fig. 1 is a side elevation of my complete vehicle.

In the drawings for purposes of illustration, I have shown my invention provided with a body representing a locomotive, it being obvious, as hereinbefore stated, that such body may represent any one of a number of wheeled objects.

The chassis of the vehicle comprises a base member 10 which extends substantially the full length of the vehicle and to which the side members 11 of the vehicle body are secured. The boiler portion of the body is represented by the circular portion 12 whose cross-sectional shape is preferaby in the form of a segment of a circle and which is supported by the side walls 11. The representation of a stack 13 is mounted upon the top of the boiler part 12 and the representation of a cow catcher 14 is secured to the lower part of the base, extending forwardly from the front end thereof. The cabin 15 of the body forms the seat 16 of the vehicle.

Figure 2:
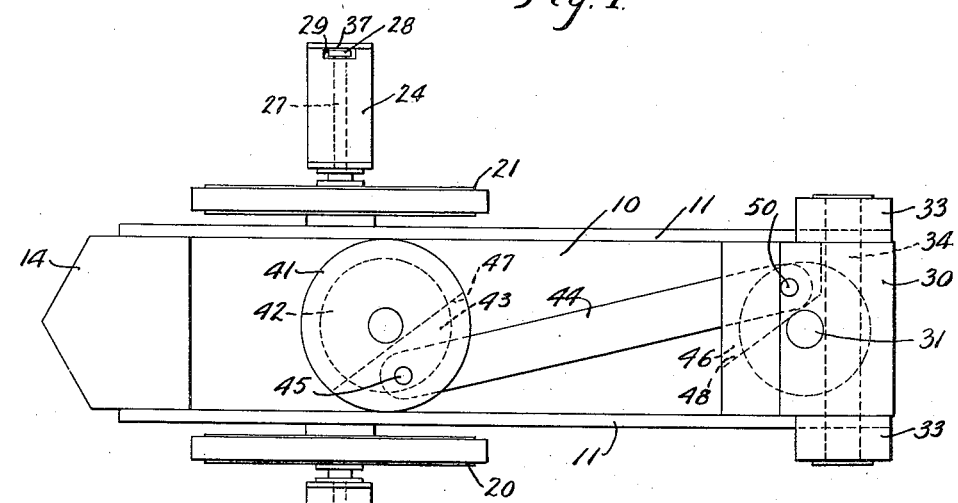
Fig. 2 is a bottom plan view thereof.
Figure 6:
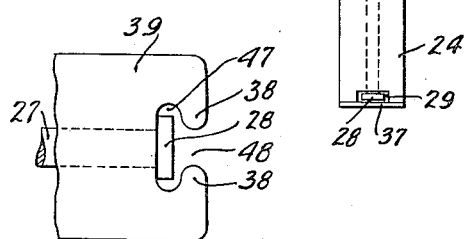
Fig. 6 is an enlarged fragmentary view of a modified form of pedal construction.

In the form of invention shown in Figs. 1–3, inclusive, to which specific reference is to be had, two driving wheels 20 and 21 are provided. These wheels are carried by an axle 22 which is of substantially straight cylindrical form and which is mounted upon the body, extending laterally across the same with its ends projecting from the side face of the body. The driving wheel 21 is fixed upon one end of the axle 22 to the opposite end of which a driving disk 23 is secured, whereby the driving wheel 21 and the driving disk 23 will be secured together for unison operation. A pedal 24 is secured to the driving wheel 21, and a similar pedal is secured to the driving disk 23. Obviously, these pedals are arranged at 180° so that the vehicle may thereby be properly propelled. Each of the pedals 24 is made preferably of rubber in the form of one single piece rotatably mounted upon an axle 27. The axle has a head 28 at its outer end, and each pedal is preferably formed with a recess 29 for the reception of the head, whereby a projecting web 37 is formed which acts as a buffer for the pedal thereby preventing the marring of furniture or other objects against which it may strike. In the modification of Fig. 6, the pedal 39 is formed with a recess 47 opening into the end of the pedal through a slot 48, two arms 38 being provided which overhang the head 28 of the axle. Obviously, when the pedal is to be assembled upon the axle, the web 37 shown in Figs. 1–4 is temporarily bent to one side of the pedal while the axle is being inserted after which the web 37 will overlie the head 28. When assembling the pedal of Fig. 6, the arms 38 are temporarily spread apart, and they will protect the axle head after returning to their normal positions.

In order to provide for differential action in the form of the invention shown in Figs. 1–3, the wheel 20 is mounted upon an axle sleeve 25 which is rotatably disposed about the axle 22 and mounted within a suitable bearing 26, whereby the wheels 20 and 21 may be rotated independently of one another when compensating for any differential action. This bearing 26 which is suitably secured to the top of the base 10 may be either of wood or metal, and it is shown as constructed of wood for clearness of illustration.

Arranged at the rear of the vehicle is a steering block 30 which is suitably mounted upon a steering pin 31 which is secured to the base 10 and extended through the block. A washer 32 is preferably disposed between the top surface of the block and the adjacent bottom surface of the base 10, thereby providing a fifth wheel. Two steering wheels 33 are provided, and one of them is arranged at each side of an axle 34. Relative rotation of the wheels with relation to the block may be accomplished either by permitting the wheels to rotate upon the axle or by securing the wheels to the axle, allowing the latter member to rotate within the block.

A steering mechanism 35 is provided for the vehicle, which comprises a vertically arranged steering shaft 36 extending through and supported by the boiler part 12 and the base 10. A suitable T-shaped handle 40 is arranged at the top of the shaft and within convenient reach of the child seated upon the vehicle. A steering disk 41 is secured to the lower end of the shaft and a washer 42 may be provided between the upper surface of this disk and the adjacent bottom surface of the base to facilitate easy operation of the steering mechanism. The steering disk is provided at one side with a slot 43 for the reception of the forward end of a substantially rigid push-pull steering link 44. The link is pivotally attached to the disk by means of a pin 45. The steering link 44 extends rearwardly and diagonally across the base 10 and has its rear end disposed within a slot 46 formed in the steering block 30. This rear end of the link is attached to the steering block by means of a pin 50. Because of the fact that the opposite ends of the steering link are disposed on opposite sides of the longitudinal axis of the vehicle, it will be obvious that when the disk 41 is rotated in clockwise manner, that the vehicle will be steering in the same direction.

The bottom 57 of the disk slot 43 and the bottom 58 of the block slot 46 will contact the link 44 at predetermined positions in the travel of the steering mechanism and thus act as stops therefor.

Referring now more particularly to the form of invention of Figs. 4 and 5, 51 and 52 are the driving wheels, the wheel 51 being shown broken away for clearness of illustration. Each of these wheels is preferably provided with a rubber tire 53. The driving wheel 51 is securely fastened to the axle 54 which extends transversely across the device and to the opposite end of which is fixed the driving disk 55. The driving wheel 52 is secured to an axle sleeve 56 which, as in the other form of invention, is rotatably disposed about the axle 54 and mounted in the bearing 60 of the device. The wheels 51 and 52 are connected together by means which compensate for the different rates of rotation thereof when the device is steered in either direction. Such means may be disposed in the space between the disk 55 and the flange 61 of the driving wheel 52 and may comprise a double-acting ratchet wheel 62 formed with a plurality of symmetrically-shaped notches 67 which are preferably semi-circular in shape. The ratchet wheel is secured to the axle 54 or to the disk 55 so that it is rotatable therewith. A spring ratchet pawl 63, having a wheel engaging hump 64 is mounted upon a screw 66 carried by the flange 61 of the wheel 52 and it is therefore rotatable therewith.

The pawl 63 may be held against the ratchet wheel with suitable spring pressure to cause the wheel 52 to be carried around with and to be rotated by the disk 55, whereby both wheels will normally be rotated in unison. When, however, differential conditions are encountered, the hump of the pawl will ride from one notch to the other in either relative direction, whereby the wheel 52 may lag behind or may rotate faster than the wheel 51. If desired, a pin 70 may be employed to press the pawl into engagement with the wheel.

In this form of invention as in the form first described, two pedals 24 are provided, only one of which being shown, and they are arranged at substantially 180° with each other.

In both forms of the invention, it is desirable that the driving disks 23 and 55 be in substantially the same plane as the narrow flanges 80 and 81, respectively, of the wheels 20 and 52, and that the space between these coacting parts be narrow so as to be neat in appearance and to avoid injury to the child. If desired, the steering disk 41 may be replaced by a crank arm and the rear end of the steering link 44 may be attached to the lower outside surface of the steering block 30.

Obviously, these and other modifications may be made without departing from the spirit of my invention or the scope of the appended claims, and I do not, therefore, wish to be limited to the exact embodiment herein shown and described.

What is claimed is:

1. A toy vehicle comprising a body representing a well-known wheeled object and forming a seat for the operator, a rotatably mounted axle carried at the forward end of said body and having its axis fixed in relation to the axis of the vehicle, a driving wheel secured to one end of said axle, a driving disk secured to the other end of said axle, pedals secured to said driving wheel and said disk in angularly spaced relation to each other, a second wheel rotatably carried by said axle and adjacent to said disk, and means carried by said body for steering said vehicle.

2. A toy vehicle comprising a body representing a well-known wheeled object and forming a seat for the operator, a rotatably mounted axle carried at the forward end of said body and having its axis fixed in relation to the axis of the vehicle, a driving wheel secured to one end of said axle, a driving disk secured to the other end of said axle, pedals secured to said driving wheel and said disk in angularly spaced relation to each other, a second wheel rotatably carried by said axle and adjacent to said disk, steering wheels at the rear of said vehicle, and steering mechanism within reach of the operator for connection to said steering wheels.

3. A toy vehicle comprising a body, a seat carried by said body, a rotatably mounted axle carried at the forward end of said body and having its axis fixed in relation to the axis of the vehicle, a driving wheel secured to one end of said axle, a driving disk secured to the other end of said axle, pedals secured to said driving wheel and said disk in angularly spaced relation to each other, a second wheel rotatably carried by said axle and adjacent to said disk, compensating means connecting said driving disk and said second wheel, and means at the rear of said body for steering said vehicle.

4. A toy vehicle comprising a body, a substantially straight axle rotatably carried at the forward end of said body and having its axis fixed in relation to the axis of the vehicle, the ends of said axle extending outwardly beyond the side faces of said body, a driving wheel secured to one end of said axle, a driving member secured to the other end of said axle, pedals secured to said driving wheel and said member in angularly spaced relation to each other, a second wheel rotatably carried by said axle and arranged adjacent to said member, a steering shaft carried at the forward end of the body, a steering disk fixed to the lower end of the shaft, a fifth wheel steering block located at the rear of said body and pivotally carried thereby, spaced steering wheels rotatably carried by said block, said steering disk being formed in its periphery with a slot at one side of the vehicle, said steering block being formed with a horizontally arranged slot at the opposite side of the vehicle, and a steering link arranged diagonally across the vehicle and having its ends pivotally engaged with said slots.

5. A toy vehicle comprising a body, a substantially straight axle rotatably carried at the forward end of said body and having its axis fixed in relation to the axis of the vehicle, the ends of said axle extending outwardly beyond the side faces of said body, a driving wheel secured to one end of said axle, a driving member secured to the other end of said axle, pedals secured to said driving wheel and said member in angularly spaced relation to each other, a second wheel rotatably carried by said axle and arranged adjacent to said member, a steering shaft carried at the forward end of the body, a steering disk fixed to the lower end of the shaft, a fifth wheel steering block located at the rear of said body and pivotally carried thereby, spaced steering wheels rotatably carried by said block, said steering disk being formed in its periphery with a lateral slot at one side of the vehicle, said steering block being formed with a horizontally arranged slot at the opposite side of the vehicle, and a steering link arranged diagonally across the vehicle and having its ends pivotally engaged with said slots, the bottoms of said slots acting as stops for the steering mechanism in either direction of operation.

6. A toy vehicle comprising a body, a rotatably mounted axle carried at the forward end of said body and having its axis fixed in relation to the axis of the vehicle, a driving wheel secured to one end of said axle, a driving disk secured to the other end of said axle, pedals secured to said driving wheel and said disk in angularly spaced relation to each other, a second wheel rotatably carried by said axle and adjacent to said disk, a double acting ratchet wheel carried by said axle adjacent to said second wheel, a resilient ratchet pawl carried by said second wheel and engageable with said ratchet wheel for restrained relative rotation therewith in either direction, and steering wheels at the rear end of said body.

7. A toy vehicle comprising a body, a substantially straight axle rotatably carried at the forward end of said body and having its axis fixed in relation to the axis of the vehicle, the ends of said axle extending outwardly beyond the side faces of said body, a driving wheel secured to one end of said axle, a driving member secured to the other end of said axle, pedals secured to said driving wheel and said member in angularly spaced relation to each other, a second wheel rotatably carried by said axle and adjacent to said member, compensating means connecting said driving member and said second wheel for permitting said vehicle to move in a curved path, a steering shaft carried by said body, a steering disk fixed to the lower end of said shaft, a steering block located at the rear of the body and pivotally carried thereby, spaced steering wheels rotatably carried by said block, and link means extending diagonally across said body and connecting said steering disk with said steering block.

8. A toy vehicle comprising a body representing a well-known wheeled object and forming a seat for the operator, a rotatably mounted axle carried at the forward end of said body and having its axis fixed in relation to the axis of the vehicle, a driving wheel secured to one end of said axle, a driving member secured to the other end of said axle, pedals secured to said driving wheel and said member in angularly spaced relation to each other, a second wheel rotatably carried by said axle, and means carried by said body for steering said vehicle.

9. A toy vehicle comprising a body representing a well-known wheeled object and forming a seat for the operator, a rotatably mounted axle carried at the forward end of said body and having its axis fixed in relation to the axis of the vehicle, a driving wheel secured to one end of said axle, a driving member secured to the other end of said axle, pedals secured to said driving wheel and said member in angularly spaced relation to each other, a second wheel rotatably carried by said axle and adjacent to said member, steering wheels at the rear of said vehicle, and steering mechanism within reach of the operator for connection to said steering wheels.

10. A toy vehicle comprising a body, a seat carried by said body, a rotatably mounted axle carried at the forward end of said body and having its axis fixed in relation to the axis of the vehicle, a driving wheel secured to one end of said axle, a driving member secured to the other end of said axle, pedals secured to said driving wheel and said member in angular relation to each other, a second wheel rotatably carried by said axle at the opposite end thereof and adjacent to said member, compensating means connecting said member and said second wheel, and means carried by said body for steering said vehicle.

11. A toy vehicle comprising a body, a rotatably mounted axle carried at the forward end of said body and having its axis fixed in relation to the axis of the vehicle, a driving wheel secured to one end of said axle, a driving member secured to the other end of said axle, pedals secured to said driving wheel and said member in angularly spaced relation to each other, a second wheel rotatably carried by said axle and adjacent to said member, a double acting ratchet wheel carried by said axle adjacent to said second wheel, a resilient ratchet pawl carried by said second wheel and engageable with said ratchet wheel for restrained relative rotation therewith in either direction, and steering wheels at the rear end of said body.

12. A toy vehicle comprising a body having a seat for the operator, a rotatably mounted axle carried at the forward end of the body and having its axis fixed in relation to the axis of the vehicle, a driving wheel fixed to one end of the axle, a driving member fixed to the other end of the axle for unison rotation with said wheel, pedals carried by said driving wheel and by said member and arranged in fixed angular relation with each other, said pedals being located upon and extending from the outside surfaces of said driving wheel and said member, a second wheel adjacent said member and mounted upon said axle so as to be free to rotate in either direction thereon relatively to said driving wheel to compensate for differential action between the driving wheel and the second wheel, and means carried at the rear end of the body for steering the vehicle.

13. A toy vehicle comprising a body having a seat for the operator, a rotatably mounted axle carried at the forward end of the body and having its axis fixed in relation to the axis of the vehicle, a driving wheel fixed to one end of the axle, a driving member fixed to the other end of the axle for unison rotation with said wheel, pedals carried by said driving wheel and by said member and arranged in fixed angular relation with each other, said pedals being located upon and extending from the outside surfaces of said driving wheel and said driving member, a second wheel adjacent said member and mounted upon said axle so as to be free to rotate in either direction thereon relatively to said driving wheel to compensate for differential action between the driving wheel and the second wheel, a steering shaft carried at the forward end of the body, a steering disk fixed to the lower end of the shaft, a fifth wheel steering block located at the rear of said body and pivotally carried thereby, spaced steering wheels rotatably carried by said block, said steering disk being formed in its periphery with a lateral slot facing one side of the vehicle, said steering block being formed with a horizontally arranged slot facing the opposite side of the vehicle, and a steering link arranged diagonally across the vehicle and having its ends pivotally engaged with said slots, the bottoms of said slots acting as stops for the steering mechanism in either direction of operation.

ROBERT PARKE.

REFERENCES CITED

The following references are of record in the file of this patent:

UNITED STATES PATENTS

| Number | Name | Date |
|---|---|---|
| 80,425 | Reynolds | July 28, 1868 |
| 90,947 | Jones | June 8, 1869 |
| 99,567 | Haussknecht | Feb. 8, 1870 |
| 309,740 | Racine | Dec. 23, 1884 |
| 473,030 | Sweetland | Apr. 19, 1892 |
| 1,286,539 | Colon | Dec. 3, 1918 |
| 1,294,985 | Werts | Feb. 18, 1919 |
| 1,402,636 | Miller | Jan. 3, 1922 |
| 1,604,549 | Davis et al. | Oct. 26, 1926 |
| 1,778,143 | Carlson | Oct. 14, 1930 |